United States Patent [19]

Wright

[11] Patent Number: 4,732,661
[45] Date of Patent: Mar. 22, 1988

[54] ELECTROLYTIC PURIFICATION SYSTEM

[75] Inventor: Francis C. Wright, Yardville, N.J.

[73] Assignee: Mercer International, Inc.

[21] Appl. No.: 790,847

[22] Filed: Oct. 24, 1985

[51] Int. Cl.$^4$ ............................................. C02F 1/46
[52] U.S. Cl. ......................................................... 204/275
[58] Field of Search ........................................... 204/275

[56] References Cited

U.S. PATENT DOCUMENTS

| | | | |
|---|---|---|---|
| 3,480,529 | 11/1969 | Waltrup | 204/273 |
| 3,944,478 | 3/1976 | Kuji | 204/275 |
| 4,179,347 | 12/1979 | Krause | 204/275 |
| 4,325,798 | 4/1982 | Mack | 204/275 |
| 4,329,211 | 5/1982 | Plantes | 204/275 |

Primary Examiner—T. M. Tufariello
Attorney, Agent, or Firm—Alan M. Sack

[57] ABSTRACT

An electrolytic flotation system (10) for removing foreign matter from waste water includes a plurality of planar electrodes (32 and 34) in a flotation tank (12). The electrodes are arranged so that they distribute the production of microbubbles uniformly throughout a large region of the flotation zone (30). Furthermore, the planes in which the electrodes lie are substantially parallel to the flow path between the inlet (14) and the outlet (16) of the tank (12). As a consequence, efficient removal of foreign matter occurs with a relatively low detention time.

3 Claims, 6 Drawing Figures

ELECTROLYTIC PURIFICATION SYSTEM

BACKGROUND OF THE INVENTION

The present invention is directed to flotation systems for purifying waste water. It is directed particularly to such systems of the electrolytic type.

One method of purifying waste water is to introduce very small bubbles ('microbubbles') into it. The microbubbles adhere to particulates and other impurities in the waste water and lift them to the surface. The water can thereby be purified by skimming a layer of froth from the water surface. There are many varieties of flotation systems, but most fall into one of two categories: the pressurized-air type and the electrolytic type.

In the pressurized-air type, air may be introduced into the waste water under pressure, causing it to dissolve in the waste water. The pressure is then relieved, and the air comes out of solution in the form of microbubbles. In other versions of the pressurized-air system, the air is introduced into waste water at atmospheric pressure by means of a device that ensures that the bubbles formed in the waste water are small. The small bubble size is important because small bubbles have more of a tendency to adhere to impurities. They are also more efficient, tending to float a greater mass of waste for a given mass of air.

The other type of flotation system, the electrolytic system, is considerably simpler in construction. It consists simply of electrodes disposed in a tank through which the waste water flows. A potential difference is imposed between the electrodes, and the resultant current through the waste water causes electrolysis of the water to generate hydrogen and oxygen bubbles. These bubbles then perform the flotation in a manner similar to that in which bubbles in pressurized-air systems do.

Clearly, the electrolytic system is considerably simpler in design and thus requires less of an initial investment. The electrolytic system does not require the compressors, high-pressure pumps, and pressure-monitoring devices that pressurized-air systems do. Nonetheless, the pressurized-air systems have been considerably more popular. The reason for this is that electrolytic systems use a high amount of energy per unit mass of solids removed.

It is accordingly an object of the present invention to reduce the power requirements of electrolytic flotation systems so as to enable users to take advantage of their low capital requirements.

SUMMARY OF THE INVENTION

The foregoing and related objects are achieved in a flotation system having electrodes whose area is large compared with the areas of electrodes for conventional flotation systems of similar sizes. According to one aspect of the invention, the electrode area is high enough so that the required gas production can be achieved with a current density of less than 100 amperes per square meter. According to another aspect of the invention, the ratio of the cell area provided by the electrodes to the rate of fluid flow is greater than 5 square meters per liter per second.

Another aspect of the invention is that the electrodes should be oriented substantially parallel to the direction of water flow between the fluid inlet and the outlet by which the purified water leaves the flotation tank. The electrodes should define a plurality of cell sections that divide the fluid flow among them and span substantially the entire cross section of the flow path, and the means for pumping the water through the flow path should pump it at such a rate that the flow of water through the cell sections is substantially nonturbulent.

In accordance with another aspect of the invention, the ratio of the total cell area provided by the electrodes to the volume of the flotation tank should be at least 2 square meters of cell area per cubic meter of tank volume.

Another aspect of the invention is that baffle plates are disposed in the flow path and oriented generally parallel to the direction of water flow between the inlet and the outlet by which the purified water leaves the tank. The baffle plates divide the flow path to define flow-path sections of smaller cross-sectional size in the total flow path so that the velocity of nonturbulent flow that can be obtained is higher than the velocity that can be obtained without the baffles.

BRIEF DESCRIPTION OF THE DRAWINGS

These and further features and advantages of the present invention are described in connection with the accompanying drawings, in which.

DETAILED DESCRIPTION OF THE PREFERRED EMBODIMENTS

A typical flotation system includes a treatment tank in which the waste water resides while the microbubbles attach themselves to impurities and carry them to the surface. The size of the flotation tank is determined by the capacity of the system—i.e., the number of gallons per minute of waste water that it treats—and by the detention time, which is the average time required for the waste water to flow from the inlet to the outlet of the tank. The required volume of the tank is equal to its capacity multiplied by its detention time. A flotation system that processes one gallon of waste water per minute and requires a detention time of one hour must have a volume of 60 gallons.

In general, the capital cost of the system increases with its volume, so it would be desirable for the detention time to be as low as possible. However, a certain amount of detention time is required in order to allow the microbubbles to diffuse through the fluid in the tank, adhere to the waste particles, and float to the surface. It might seem desirable to arrange the fluid flow so that it is highly turbulent and the bubbles and solids thereby mix quickly within the tank. However, it turns out that turbulent flow is undesirable because it results in agglomeration of microbubbles into much larger bubbles, which do not effeciently cause impurity flotation. The flow must thus be substantially non-turbulent, so the fluid velocity must be kept low. This tends to increase the detention time required to obtain a given level of solids removal.

Other design parameters encountered in discussions of flotation systems are the ratio of gas produced to solids removed and the ratio of energy consumed to the volume of water processed. The former parameter has in prior-art systems ranged from 0.01 to 0.06 or more kilograms of gas used per kilogram of solids removed, the ratio depending on the type of waste water and the intended purity. The gas-to-solids ratio largely determines the energy required to float a given quantity of solids because, for a given electrode voltage, the power consumed is proportional to the rate of gas production. By employing the teachings of the present invention, it is possible to reduce, by as much as an order of magnitude or more, the power consumption, the detention time, and the ratio of gas to removed solids.

Figure 1:
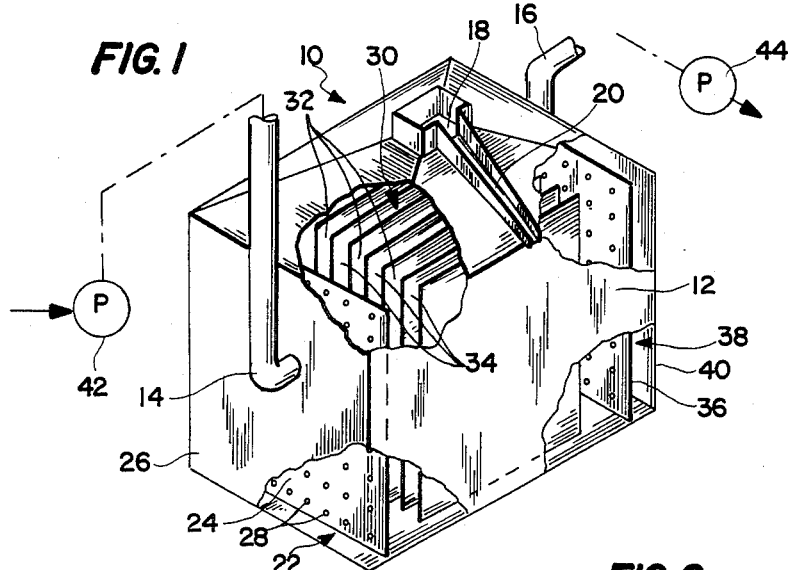
FIG. 1 is a perspective view, with parts broken away, of an electrolytic flotation system incorporating the teachings of the present invention.
Figure 2:
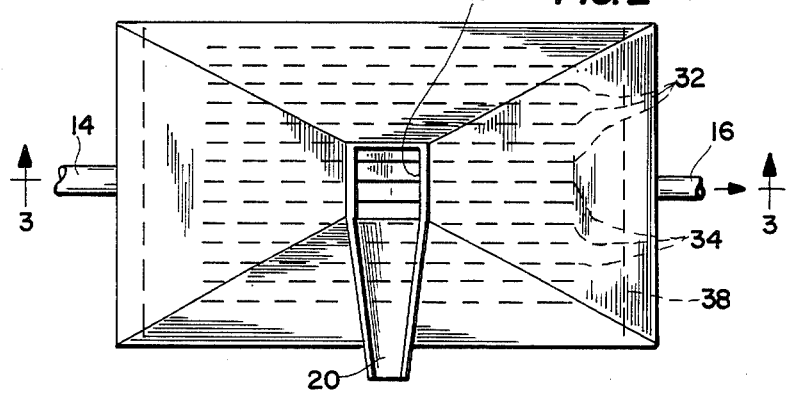
FIG. 2 is a plan view of the flotation system of FIG. 1.
Figure 3:
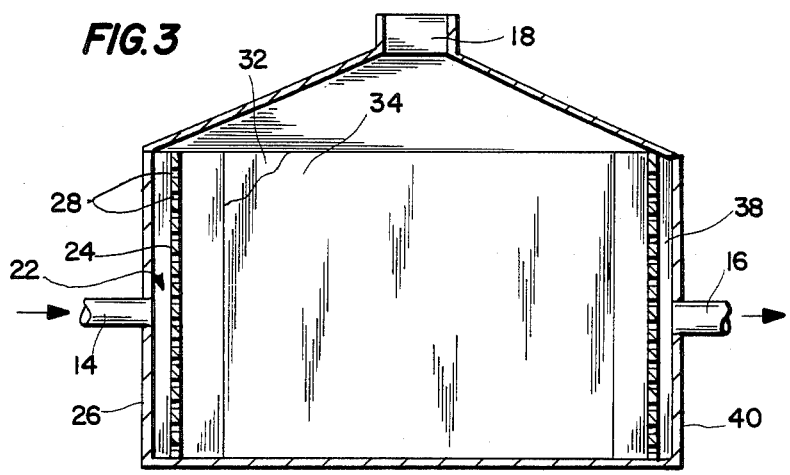
FIG. 3 is a cross-sectional view taken at line 3—3 of FIG. 2.

The flotation system 10 depicted in FIGS. 1, 2, and 3 includes a tank 12 into which the waste water to be purified is introduced by an inlet pipe 14. The purified waste water is removed by means of an outlet pipe 16, and the removed solids overflow through an opening 18 in the top of the tank 12 and flow out through a drain 20.

The waste water entering through the inlet pipe 14 flows into a flow-distribution region 22 defined by a distribution plate 24 and the left wall 26 of the tank 12. The distribution plate 24, which has perforations 28 for permitting the waste water to enter a flotation zone 30, distributes the waste-water flow so that the flow inside the flotation zone 30, after some initial turbulence, is substantially uniform and normal to the distribution plate 24. A plurality of parallel anode and cathode plates 32 and 34 are oriented in planes parallel to the direction of waste-water flow in the flotation zone 30. The cathodes 32 are connected in parallel to one side of the voltage source, not shown, while the anode plates are connected in parallel to the other side of the source. Cathode plates 32 are interleaved with anode plates 34 so that each cathode plate 32 except the outermost one is disposed between two anode plates 34, and vice versa. The voltage source thus sets up a potential difference between each pair of adjacent plates and thereby causes electrolysis in the waste water, generating microbubbles of hydrogen and oxygen gas between the plates.

The cathode and anode plates 32 and 34 are disposed relatively close to each other, typically having a spacing of less than a centimeter, and they extend throughout substantially the entire cross section of the flow path; that is, any path from the tank inlet to the tank outlet must come into close proximity with the plates 32 and 34 at some point. In this connection, it should be stated that there is ordinarily a sump region, not shown in the drawings, beneath the flotation zone to act as a repository for heavy impurities that settle out instead of floating to the water surface. There are no electrodes in this sump region, and it is possible, in some arrangements, to draw a path from the inlet through the sump region to the outlet in such a manner that the path is relatively far from the electrodes at all points. In practice, however, the actual flow path taken by water from the inlet to the outlet does not include the sump region, so all true flow paths include substantial lengths in close proximity to a pair of electrodes. As a result, the average time between production of a microbubble and its adherence to a particle is relatively short, and this fact keeps the needed detention time fairly low. As the waste water flows between the plates, moreover, their tendency toward turbulence is reduced because of the low inter-electrode spacing. The velocity of flow through the flotation zone 30 can therefore be relatively high without producing turbulence and the resulting agglomeration of microbubbles into larger, less-efficient bubbles.

When bubbles adhere to suspended particles, they cause the particles to float upwards and generate a froth on the surface of the waste water in the flotation zone 30. This froth "boils over" the top of the tank 12, flowing out top opening 18 and down through drain 20 to an appropriate receptacle (not shown). The remaining water, from which the impurities have been removed, then flows through a second distributor plate 36 into a collection zone 38 defined by the second distributor plate 36 and the right wall 40. From the collection zone, the purified water flows through an outlet pipe 16 for further processing, reuse, or disposal. The desired flow rate may be maintained by an inlet pump 42 and/or an outlet pump 44, which are typically operated to maintain a predetermined flow rate but may optionally be controlled in response to the water level within the flotation zone 30 or in response to some other parameter of interest.

In one version of the system of the present invention, I employed 22 plates 8.5 inches (22 centimeters) high by 4.33 inches (11 centimeters) long in a tank enclosure 8.5 inches high by 7.76 inches wide with a length between the distributor plates of 1.0 foot. That is, the electrodes extended the height of the tank but only about a third of the length of the flotation zone. In such a system, I employed a flow rate of one-half gallon per minute (1.89 liters per minute), thereby obtaining a flow velocity of 1.75 inches per minute (0.074 centimeters per second). In the presence of the electrodes this flow velocity resulted in non-turtulent flow. The water to be purified was car-wash waste water having approximately 200 milligrams of suspended matter per liter of water. The current density was 23 amperes per square meter with 38.5 square meters of cell area per cubic meter of flotation-tank volume and 15.9 square meters of cell area per liter per second of flow. I applied a potential difference of 7.5 volts between the anodes and cathodes, and the system drew 11.5 amperes, thereby using 0.017 kilogram of gas per kilogram of solids floated.

Because no attempt was made during that demonstration to minimize the energy consumption of the system, the above rate of power usage is not significantly lower than that of other electrolytic flotation systems. However, the removal of impurities was quite effective despite a detention time of only 8.3 minutes, while a conventional electrolytic flotation system had proved unsatisfactory with this type of waste water.

In another test, a device incorporating the teachings of the present invention was employed on machinery wash water. The wash water was 33 percent by volume and 3.3 percent by weight solids or debris and decomposition products of oils and solvents. In this arrangement, 24 plates spaced 0.367 inch (0.932 centimeter) apart were used as the electrodes. Each electrode measured 8.5 inches by 4.3 inches (21.6 centimeters by 10.92 centimeters), resulting in 36.55 square inches (236 square centimeters) of plate area. With 24 plates, there were 23 cell sections, so the total cell area was 23 sections × 36.55 square inches per section, or a total cell area of 5.88 square feet (0.546 square meter). With a flow rate of 0.45 gallon (1.70 liters) per minute through a 0.5-square-foot (0.0465 square meter) entry area in a tank having a 1-foot (0.305-meter) length, the resultant detention time was 8.33 minutes. A potential difference of 7.5 volts was impressed across the electrolysis cell. This caused 15 amperes to flow in the system. Accordingly, the current density in the electrolysis cell was approximately 27.5 amperes per square meter. There were thus 38.5 square meters of cell area per cubic meter of tank volume and 19.2 square meters of cell area per liter per second of water flow through the flotation tank. The result was a highly satisfactory cleaning of the wash water using three grams of gas per kilogram of solids removed. Again, no attempt was made to minimize the energy consumption; the purpose of the test was only to demonstrate the effectiveness of the device. Still, this low ratio of produced gas to removed solids compares very favorably with those of prior-art devices.

A third demonstration employed the same device as was used in the second demonstration, and machinery wash water was again used. In this demonstration, the wash water was condensate from steam cleaning containing approximately 2 percent oil and black debris. The flow rate was the same as in the second demonstration, but a potential difference of 8.5 volts was impressed across the electrolysis cell, and the resultant current was 9.0 amperes, or 1.53 amperes per square foot (16.5 amp/m$^2$) of cell area with 38.5 square meters of cell area per cubic meter of flotation-tank volume and 17.3 square meters of cell area per liter per second of flow. Again, the ratio of gas produced to impurities removed was 3 grams per kilogram.

The same type of waste water cleaned in the second demonstration was also cleaned in the fourth demonstration. Additionally, the same size of flotation tank and same flow rate were employed. The separation between electrodes was maintained at 0.367 inch (0.932 centimeter). The plates were the same size, but a second set was placed behind and wired to the first set so that the effective area of the cell was doubled. With this arrangement, a potential difference of 7.5 volts was impressed across the electrodes, and 15 amperes were drawn, resulting in a current density of 13.7 amperes per square meter of cell area with 77.0 square meters of cell area per cubic meter of flotation-tank volume and 34.6 square meters of cell area per liter per second of flow through the flotation tank. The result was satisfactory removal of foreign matter with a gas usage of three grams of gas per kilogram of removed solids.

The fifth demonstration treated waste water that resulted from pressure spraying of industrial machinery with detergent. The waste water had a pH of 10.6 and contained approximately 1.5 grams of suspended matter per liter of waste water. The suspended matter consisted of oily and black particulates with surfactant. Since the flow rate was only 0.25 gallon per minute (0.0158 liter per second), the ratio of cell area to flow rate was 34.6 square meters per liter per second. The ratio of cell area to flotation-zone volume was 38.5 square meters per cubic meter.

When a potential difference of 3.5 volts was impressed across the electrolytic cell, ten amperes were drawn, resulting in a current density of 18.3 amperes per square meter of cell area. With a detention time of 15.0 minutes, satisfactory results were achieved with a gas usage of 0.079 kilogram of gas produced per kilogram of floated solids. The energy usage in this demonstration was considerably higher than in some others, but I believe that nearly equivalent results could have been obtained with a much lower power consumption.

The last demonstration also involved machinery wash water, generally oily water having from five to fourteen percent oil and debris. With a flotation-tank and electrode arrangement the same as that in the second demonstration and a flow rate of one-half gallon per minute (0.0316 liter per second), a potential difference of 8.5 volts was applied across the electrodes, and the unit drew 8.5 amperes as a result, or 15.6 amperes per square meter. Satisfactory results were obtained with a gas-to-solids ratio of only 2.5 grams of gas per kilogram of removed solids. The ratio of electrode area to flow rate was 34.6 square meters per liter per second.

My experience has been that many types of waste water that are not amenable to satisfactory cleaning by conventional electrolytic flotation devices can be treated satisfactorily with an electrolytic flotation device of the type described herein. I believe that one or more of several of the features of the present invention contribute to the beneficial results. One feature is the use of baffles throughout substantially the entire cross section of the flow path. That is, water passing from the inlet 14 to the outlet 16 flows in a path whose cross section is a vertical plane perpendicular to the electrodes 32 and 34. The electrodes 32 and 34 act as baffles, splitting the flow path into narrow sections, in which a relatively high flow is possible before turbulence sets in.

Another feature is that the electrodes are high in area. To provide an adequate exposure of the foreign matter to microbubble production, I believe that the cell area should be at least 5 square meters per liter per second of the liquid flow. I also prefer at least 2 square meters of cell area per cubic meter of flotation-zone volume.

Because of the high cell area, the current density is low. This results in the microbubbles' being widely dispersed from the moment they are created; there is no need, as there is in some prior-art systems, for diffusion from a concentrated production area to the region in which the bubbles are to adhere to the matter to be removed.

While all the current densities in the examples above were less than 28 amperes per square meter, current densities this low are not required, and I believe that much of the benefit of the present invention can be obtained with current densities below approximately 100 amperes per square meter. From an operational standpoint, of course, there is no lower limit on the current density, but I believe that current densities below 2 amperes per square meter would result in prohibitively large electrodes and failure to produce a significant amount of microbubbles per unit area.

Another beneficial feature of this invention is the arrangement of the electrodes with respect to the flow path. In the versions employed in the demonstrations, there is no path of flow from the inlet to the outlet that did not come within about 0.18 inch (0.47 centimeter) from an electrode. Thus, the bubbles did not have to travel far before reaching the suspended matter to coat it. Of course, it is not absolutely necessary that the electrodes be kept this close, but I prefer to keep the maximum path-to-electrode distance below approximately 5.0 centimeters. Thus, I prefer an interelectrode distance of less than 10 centimeters.

Figure 4:
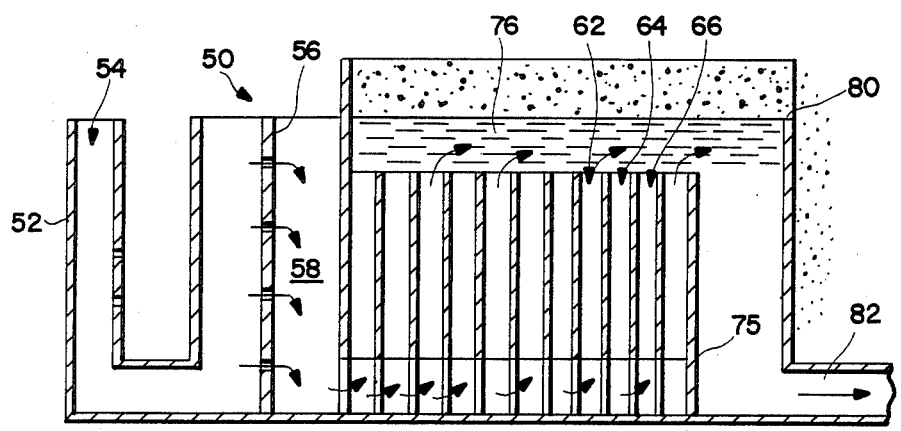
FIG. 4 is a diagrammatic cross-sectional view of an alternate embodiment of the present invention.
Figure 5:
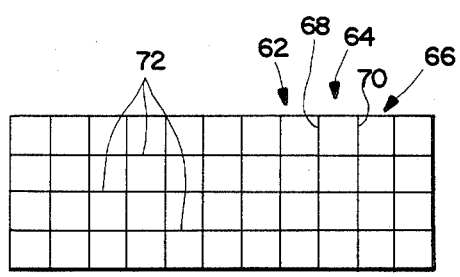
FIG. 5 is a simplified plan view of a portion of the system of FIG. 4.
Figure 6:
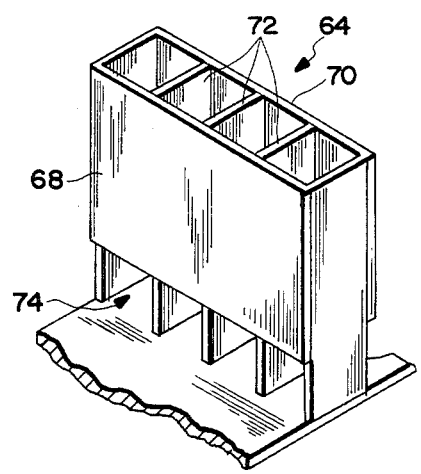
FIG. 6 is a perspective view of the portion of the cell array of the system of FIGS. 4 and 5.

While the flow of the liquid through the electrolysis cells in the arrangements that I have built has been predominantly horizontal, the teachings of the present invention can be employed in electrolytic flotation systems that differ from this type of an arrangement. In FIGS. 4, 5, and 6, an arrangement 50 is depicted in which the flow of the water through the electrolysis cell is vertical. In flotation system 50, tank 52 has an inlet 54 for receiving the water to be reclaimed. The water from the inlet 54 flows through a distributor plate 56 to a fluid-distribution region 58, in which, as in the flow-distribution region 30 of FIG. 1, initial turbulence dies out. Unlike the arrangement in FIGS. 1, 2, and 3, however, the arrangement in FIG. 4 includes an array 60 of vertical cell sections such as sections 62, 64, and 66. Section 64 is defined by two electrodes, a positive electrode 68 and a negative electrode 70, that extend parallel to the direction of fluid flow through the cell. Thus, the electrodes serve as baffle plates, dividing the flow among the various cell sections and reducing the possibility of turbulence. However, the electrodes are not the only baffle plates. Further baffle plates 72 made of a non-conducting material extend parallel to the direction of fluid flow through the cell and perpendicular to the electrodes. These baffles further reduce the possibility of turbulence and thus allow a greater fluid-flow rate through the cell.

As best seen in FIG. 6, exemplary cell section 64 has a lower entry region 74 below the lower ends of the electrodes 68 and 70. The water can flow through the entry region 74 either to another section or up between electrodes 68 and 70, where the suspended foreign matter is coated with microbubbles produced by the electrolysis resulting from the flow of electric current through the water between the electrodes 68 and 70. The entry region is terminated by a partition 75 so that all of the water must flow upward through the cells.

When current flows between the electrodes 68 and 70, bubbles are formed that rise with the fluid flow into an exit region 76 above the cells. In the exit region 76, the fluid flow turns to the right in FIG. 4. However, the microbubbles and the foreign matter to which they have adhered form a foam on the upper surface of the water in the tank 52. A reduced-height edge 80 at the right end of the tank permits the foam to flow out of the tank for collection in any appropriate manner. The remaining, purified liquid flows down through an outlet 82 to be disposed of as desired.

Clearly, the arrangement of FIGS. 4, 5, and 6 differs considerably from that of FIGS. 1, 2, and 3, yet it, too, incorporates the teachings of the present invention. The teachings of the present invention can thus be incorporated in a wide variety of electrolytic flotation systems.

What is claimed as new and desired to be secured by Letters Patent of the United States is:

1. An electroyltic flotation system for purification of wastewater, comprising:
   a. a tank for containing wastewater;
   b. an inlet for the admission of the wastewater at a first end of said tank;
   c. a first perforated distribution baffle extending vertically across said tank to create a flow distribution region between said first end of said tank and said first perforated distribution baffle;
   d. a second perforated distribution baffle extending vertically across said tank opposite and substantially parallel to said first perforated distribution baffle, said first and said second perforated distribution baffles creating a substantially non-turbulent flow of said wastewater in a flow path perpendicular to said perforated distribution baffles from said first to said second perforated distribution baffle, said flow path of wastewater having a cross-section parallel to said first and second perforated distribution baffles;
   e. a plurality of planar electrodes extending vertically in said tank and perpendicular to said first and second perforated distribution baffles, said planar electrodes are immersed in said wastewater and aligned parallel to said flow of wastewater, spanning substantially the entire cross-section of the flow path of wastewater and splitting the flow of wastewater into vertical substantially non-turbulent streams parallel to said electrodes;
   f. a first outlet for the emission of purified wastewater flowing from said second perforated distribution baffle out of said tank;
   g. a means for pumping said wastewater from said inlet to said first outlet at a rate which allows the flow of wastewater between said planar electrodes to be substantially non-turbulent;
   h. means for driving the electrodes with a current density between adjacent electrodes of less than 100 amperes per square meter to generate microbubbles in said flow of wastewater between said adjacent electrodes, the micro-bubbles adhere to and float waste in said wastewater above said electrodes;
   i. a second outlet means located above said electrodes for emission of said waste floated by said microbubbles out of said tank.

2. An electrolytic flotation system as recited in claim 1, wherein adjacent electrodes are separated by a distance of less than 5 centimeters.

3. An electrolytic flotation system as recited in claim 2, wherein said tank includes a sump region below said electrodes for removing settled wastes.

* * * * *